(12) United States Patent
Bunger

(10) Patent No.: US 6,944,859 B2
(45) Date of Patent: Sep. 13, 2005

(54) SYSTEM AND METHOD FOR AUTOMATICALLY INSTALLING DATA ON A HANDHELD COMPUTER

(75) Inventor: Samuel David Bunger, Bellingham, WA (US)

(73) Assignee: ePocrates, Inc., San Mateo, CA (US)

( * ) Notice: Subject to any disclaimer, the term of this patent is extended or adjusted under 35 U.S.C. 154(b) by 202 days.

(21) Appl. No.: 10/355,686

(22) Filed: Jan. 30, 2003

(65) Prior Publication Data

US 2004/0154014 A1 Aug. 5, 2004

(51) Int. Cl.[7] .............................................. G06F 9/445
(52) U.S. Cl. .......................... 717/178; 717/173; 707/1; 707/10
(58) Field of Search ................................ 717/174, 173, 717/175, 178; 707/1, 10; 709/204, 231

(56) References Cited

U.S. PATENT DOCUMENTS

| | | |
|---|---|---|
| 6,341,316 B1 | 1/2002 | Kloba et al. |
| 6,553,375 B1 * | 4/2003 | Huang et al. .................. 707/10 |
| 2004/0002943 A1 * | 1/2004 | Merrill et al. .................. 707/1 |

* cited by examiner

Primary Examiner—Antony Nguyen-Ba
Assistant Examiner—Chih-Ching Chow
(74) Attorney, Agent, or Firm—Morgan, Lewis & Bockius LLP

(57) ABSTRACT

A client computer requests a client-handheld conduit file from an installation server. The client computer then receives the client-handheld conduit file from the installation server and establishing a synchronization session between the client computer and a handheld computer coupled to the client computer. The client-handheld conduit file is then transmitted to the handheld computer from the client computer, and a client-handheld conduit opened between the client computer and the handheld computer using the client-handheld conduit file. A handheld file is subsequently requested from the installation server. The client computer receives the handheld file from the installation server, and transmits the handheld file from the client computer to the handheld computer for installation on the handheld computer. This entire method is performed each time a new handheld file is installed on the handheld computer. Also, all steps following the establishing step occur without any user intervention.

14 Claims, 10 Drawing Sheets

SYSTEM AND METHOD FOR AUTOMATICALLY INSTALLING DATA ON A HANDHELD COMPUTER

BACKGROUND OF THE INVENTION

1. Field of the Invention

The invention relates generally to technology for installing software. More particularly the invention is directed to a system and method for the initial download and automatic installation of handheld file(s) on a handheld computer.

2. Description of Related Art

The initial installation of a complete software program in a memory of a computer can be a difficult and complex task for nontechnical computer users. The installation process typically requires users to perform multiple steps to install the new software. Moreover, if the installation is not completed properly, the software program will not operate as designed or may not operate at all.

Typically, after market software programs are installed on a computer through the use of media such as floppy or compact disks. These programs are installed on the computer in a variety of ways. For example, the program files may be copied onto the computer's hard drive and then installed by running an executable file. Alternatively, the disks may be inserted into the computer's disk drive and the software program installed directly from the media. Both methods, however, entail multiple steps to install the program, such as inserting the media, copying the files, running the executable, and so on. Also, these methods require basic computing knowledge of how to copy files or invoke a program located on the media. Accordingly, initial installations are plagued with problems.

With the advent of computer networks such as the Internet, it has become possible to download software programs directly from the network. These networks typically comprise servers, which store information, data files, Webpages, and the like and transmit them to client computers. In the early days of the Internet, file transfers were limited by bandwidth restrictions. Nowadays, with the increase in bandwidth and modem speeds, computer users frequently download and install large software programs from remote servers on the Internet. In addition, as greater bandwidth becomes available, users are able to download even larger software programs. Typically, these files are downloaded in compressed form, such as in ZIP or RAR format, and then decompressed before being installed. Once decompressed, the user invokes one of the decompressed executable files, typically setup.exe or install.exe, to install the software program. While this method eliminates many of the steps of installation from media, the installation process is still a multi-step process that often creates confusion for less technical users. Indeed, the downloading process and initial installation of software programs still plagues many users.

To address users woes, new software installation programs have been developed. One such installation program is INSTALLSHIELD™ made by InstallShield Software Corp. Software programs such as INSTALLSHIELD™ create a single executable installation file that does not have to be decompressed by the user before installation. With INSTALLSHIELD™ the software developer uses templates and pre-built interface objects that make it easy to package the software such that the installation files and software files can be accessed and invoked from the single executable installation file. Users who install software packaged with INSTALLSHIELD™ are therefore able to install the software program quickly and without extensive knowledge regarding computers without affecting other applications or system characteristics. The INSTALLSHIELD™ program itself decompresses and invokes the necessary installation files. To install new software, a user downloads the single executable file to his/her computer's hard drive. The user then locates the downloaded software file on the hard drive and invokes it to begin the software installation. The installation files are then automatically decompressed to a temporary directory and a setup file is invoked. Once the software has been installed, the temporary directory is erased. While INSTALLSHIELD™ has simplified the installation process, it nevertheless is still a multi-step process. In fact, users most often have difficulties downloading the file, locating the file once downloaded, and invoking the file. Also, other problems may arise if the user disrupts the software program during installation.

Furthermore, the newer generations of Personal Digital Assistants (PDAs) now allow users to install after market software on their devices. PDAs are lightweight, hand-held, usually pen-based computers used as personal organizers, etc. Examples of PDAs are the various PALM™, HANDSPRING™, SONY CLIE™, and COMPAQ IPAC™ computing devices. To synchronize data between a PDA and desktop computer, a communication link is created between the two computers via a cable or wireless connection.

Typically, downloading and installing new software programs onto a PDA is a complex and time consuming task, even more so than for desktop or laptop computers. This is because of the additional steps that are required for transferring data from a desktop or laptop computer to the PDA. In particular, to install a new software program from a remote server, a user typically downloads one or more files to a desktop or laptop computer, and thereafter copies the files onto the PDA via the PDA's various proprietary synchronization mechanisms. For example, a file must first be downloaded to a desktop computer and decompressed. The decompressed file is then copied to a PDA coupled to the desktop computer. Each step by the user adds additional complexity, thereby creating opportunities for installation failure.

A number of existing systems exist for downloading and updating Web content to a PDA. For example, AVANTGO™ and VINDIGO™ allow users to update content on their PDAs. These systems, however, require the user to have already installed the system's proprietary software on the PDA. Installation of this proprietary software, however, suffers from all of the same drawbacks described above. In fact, if the installation of the proprietary software is not completed successfully, the content updates cannot take place.

In addition, the initial download and installation of the abovementioned proprietary software does not provide for the automatic customization of the installation based on the user's particular PDA.

Furthermore, the complexity of installing and/or upgrading software and data on both a desktop computer and a PDA is more than most non-technical users can handle. In fact, the Applicant has found that an unusually high percentage of support queries are related to the initial installation of their software programs onto user's PDAs.

In light of the shortcomings identified above, there is a need for a method of seamlessly downloading and installing new software onto computing devices, particularly PDAs. Such a method should provide for the transmittal of the software program between a remote installation server and a desktop, laptop, or handheld computer, such as a PDA. It is also desirable to have a means for automatically customizing the new installation.

BRIEF SUMMARY OF THE INVENTION

According to the invention there is provided a computer implemented method for installing handheld file(s) on a handheld computer. A client computer requests a client-handheld conduit file from an installation server. The client computer then receives the client-handheld conduit file from the installation server and establishing a synchronization session between the client computer and a handheld computer coupled to the client computer. The client-handheld conduit file is then transmitted to the handheld computer from the client computer, and a client-handheld conduit opened between the client computer and the handheld computer using the client-handheld conduit file. The local environment on the handheld computer is then preferably determined via the client-handheld conduit. A handheld file is subsequently requested from the installation server. The client computer receives the handheld file from the installation server, and transmits the handheld file from the client computer to the handheld computer for installation on the handheld computer. The particular handheld file requested is preferably chosen based on the local environment on the handheld computer. This entire method is performed each time a new handheld file is installed on the handheld computer. Also, all steps following the establishing step occur without any user intervention.

The present invention also provides a computer implemented method for installing a handheld file on a handheld computer. The computer implemented method firstly establishes a synchronization session between a handheld computer and a client computer. The handheld computer then receives a client-handheld conduit file from the client computer. A client-handheld conduit is opened between the client computer and the handheld computer using the client-handheld conduit file. A handheld file is then received at the handheld computer from the client computer. This handheld file is then installed on the handheld computer. Again, the entire method is performed each time a new handheld file is installed on the handheld computer. Also, all steps following the establishing step occur without any user intervention.

Still further, the present invention provides a computer program product for installing a new handheld file(s) on a handheld computer. The computer program product comprising a computer readable storage and a computer program stored therein. The computer program includes instructions for performing the above described methods.

Also provided is a system for installing a new handheld file(s) on a handheld computer. The system includes at least one installation server coupled to a network at least one client computer coupled to the network, and a handheld computer. The client computer includes a Central Processing Unit (CPU), communications circuitry, and a memory. Similarly, the handheld computer includes a Central Processing Unit (CPU), communications circuitry, and a memory. The memories include instructions fr performing the above described methods.

Accordingly, the present invention provides a method for seamlessly downloading and installing new handheld file(s) onto a handheld computer. The installation eliminates the multi-step process which necessitates continual user action. Further automatic customization of the new installation is directed by the installation server during the transmittal of the handheld file(s) between a remote installation server and the handheld computer. Therefore, the above described methods eliminate the need to pre-install any installation or conduit files on the handheld computer.

BRIEF DESCRIPTION OF THE DRAWINGS

For a better understanding of the nature and objects of the invention, reference should be made to the following detailed description, taken in conjunction with the accompanying drawings, in which.

Like reference numerals refer to corresponding parts throughout the several views of the drawings.

DETAILED DESCRIPTION OF THE INVENTION

A system and method are provided for downloading and automatically installing new handheld file(s) from an installation server onto a handheld computer. A handheld computer is preferably any portable computing device, such as a PDA, tablet PC, or the like.

Figure 1:
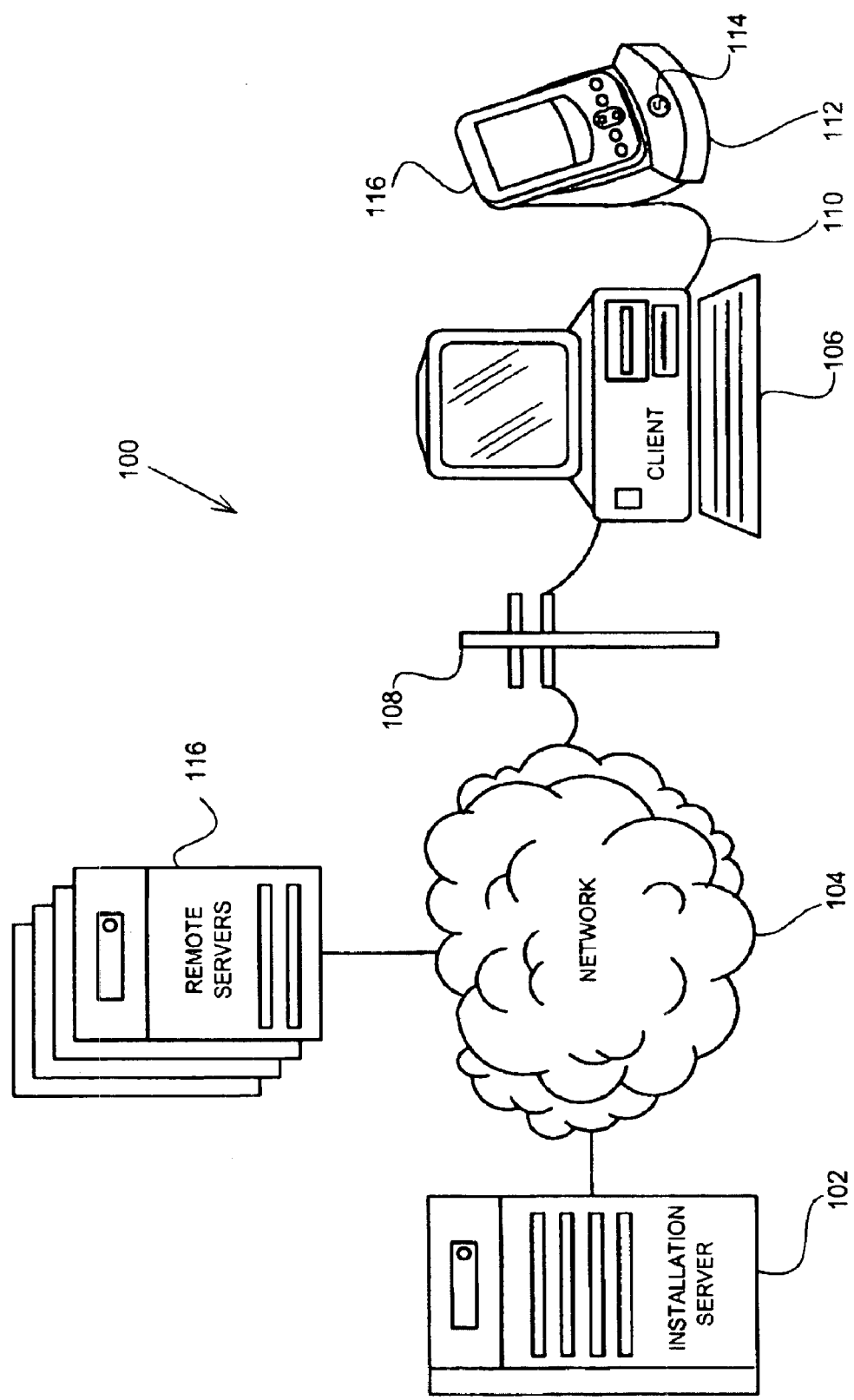
FIG. 1 is a diagrammatic view of a system architecture in which the present invention is used.

FIG. 1 is a diagrammatic view of a system architecture 100 in which the present invention is used. The system architecture 100 comprises an installation server 102 linked to a network 104. The network 104 may be any network, such as a Local Area Network (LAN), or Wide Area Network (WAN), an Extranet, or an Intranet. However, in a preferred embodiment, the network 104 is the Internet. Although only one installation server 102 is depicted, one skilled in the art will recognize that any number of installation servers may be utilized.

The network 104 is coupled to a client computer 106 through a first communication link 108, such as a wireless connection, phone line, cable line, digital subscriber line, infra-red link, or the like. The client computer 106 includes any computing device that can couple to the network 104 via the communication link. The client computer 106 may be a personal computer, laptop computer, handheld computer, mainframe computer, or the like.

In one embodiment, a handheld computer 116 is linked to the client computer 106 via a second communication link 110. This second communication link 110 is preferably a USB, serial, infra-red, or wireless link such as WIFI (Wireless Fidelity (IEEE 802.11b) wireless networking). In one embodiment, the communication link 110 communicates with the handheld computer through a cradle 112.

When communicating, the handheld computer 116 rests in the cradle 112.

Typically, to communicate with the client computer, a button 114 on the cradle 112 is depressed which initiates the synchronization of the handheld computer 116 with the client computer 106. This button 114 is commonly referred to as a HOTSYNC™ button in the PALM™ operating environment.

Figure 2:
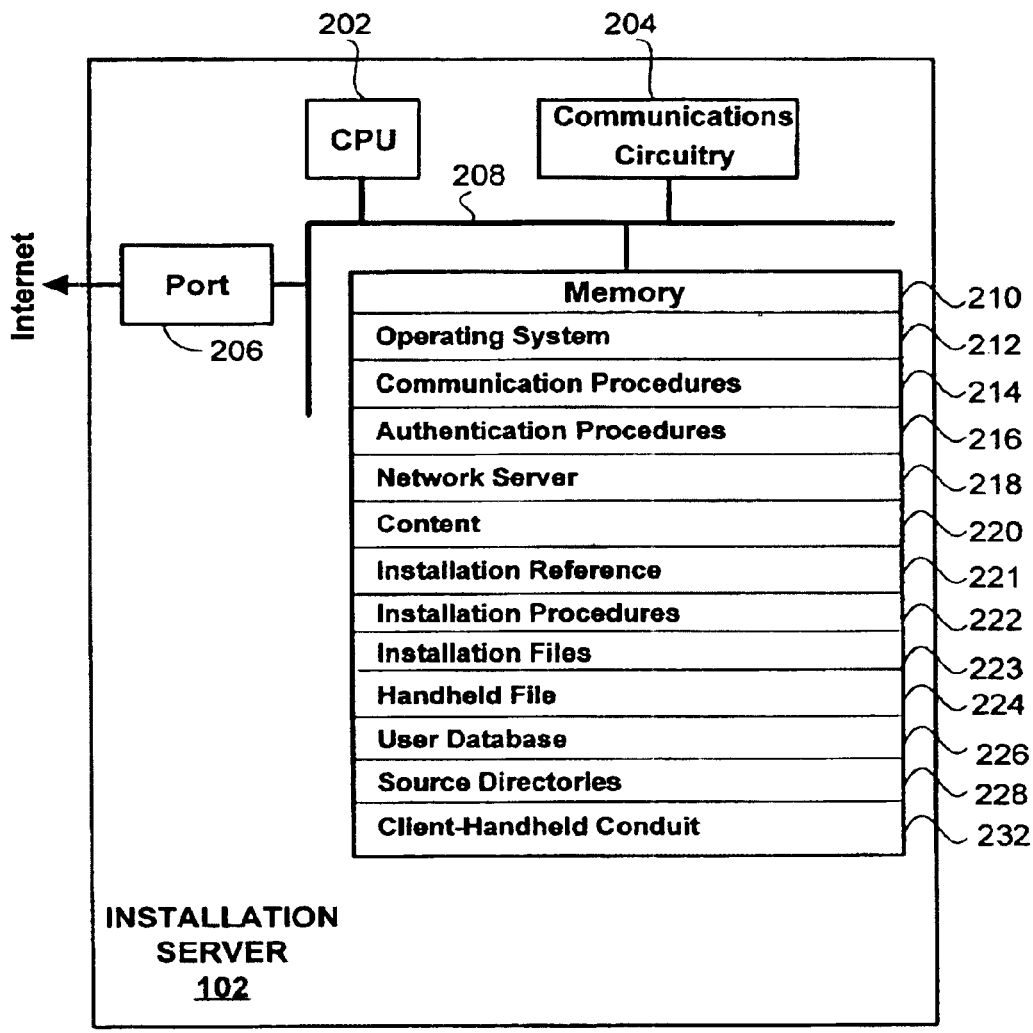
FIG. 2 is a diagrammatic view of the installation server shown in FIG. 1.

FIG. 2 is a block diagram of the installation server 102 shown in FIG. 1. The installation server 102 contains a plurality of components such as, at least one central processing unit (CPU) 202, communications circuitry 204, at least one communications port 206, a memory 210, and at least one bus 208 that connects the aforementioned components.

The communications circuitry 204 and the communications port 206 preferably include one or more Network Interface Cards (NICs) configured to communicate with the network 104 (FIG. 1) and the client computer 106 (FIG. 1). The memory 210 preferably comprises Random Access Memory (RAM) and/or Read Only Memory (ROM). The memory 210 preferably includes an operating system 212 which has instructions for communicating, processing, accessing, storing, or searching data. Examples of suitable operating systems include MICROSOFT WINDOWS™, DOS™, UNIX™, LINUX™ and MAC OS™. In addition, memory 210 preferably includes communication procedures 214, authentication procedures 216, a network server 218, content 220, an installation reference 221, installation procedures 222, a user database 226, one or more source directories 228 containing software and/or other data (hereinafter "handheld file") 224, and a client-handheld conduit file 232.

The communications procedures 214 are used for communicating with both the client computer 106 (FIG. 1) and the network 104 (FIG. 1). The authentication procedures 216, are used for authenticating users, such as through a username and password system. Successful completion of the authentication procedures gives users access to the handheld file 224 on the installation server 102.

The network server 218 receives and delivers data between itself and the client computer 106 (FIG. 1). The network server 218 also executes server-side scripts (CGI scripts, JSPs, ASPs, etc.) that provide functions such as database searching. The content 220 is any information that is available for retrieval by the user, including Web-pages, images, music, audio, white papers, drivers, as well as training, educational and reference materials. The content 220 is not presented in a programming language but rather in a "presentation language." Examples of presentation languages include HTML, XML, XHTML and CGI.

The installation procedures 222 are used to install the client-handheld conduit file 232, and a handheld file 224 onto the handheld computer 116 (FIG. 1). The client-handheld conduit file 232 is used to setup a direct communication link between the installation server and the handheld computer. Use of the aforementioned components of the memory 210 is explained in further detail below in relation to FIGS. 5A–5F.

Figure 3:
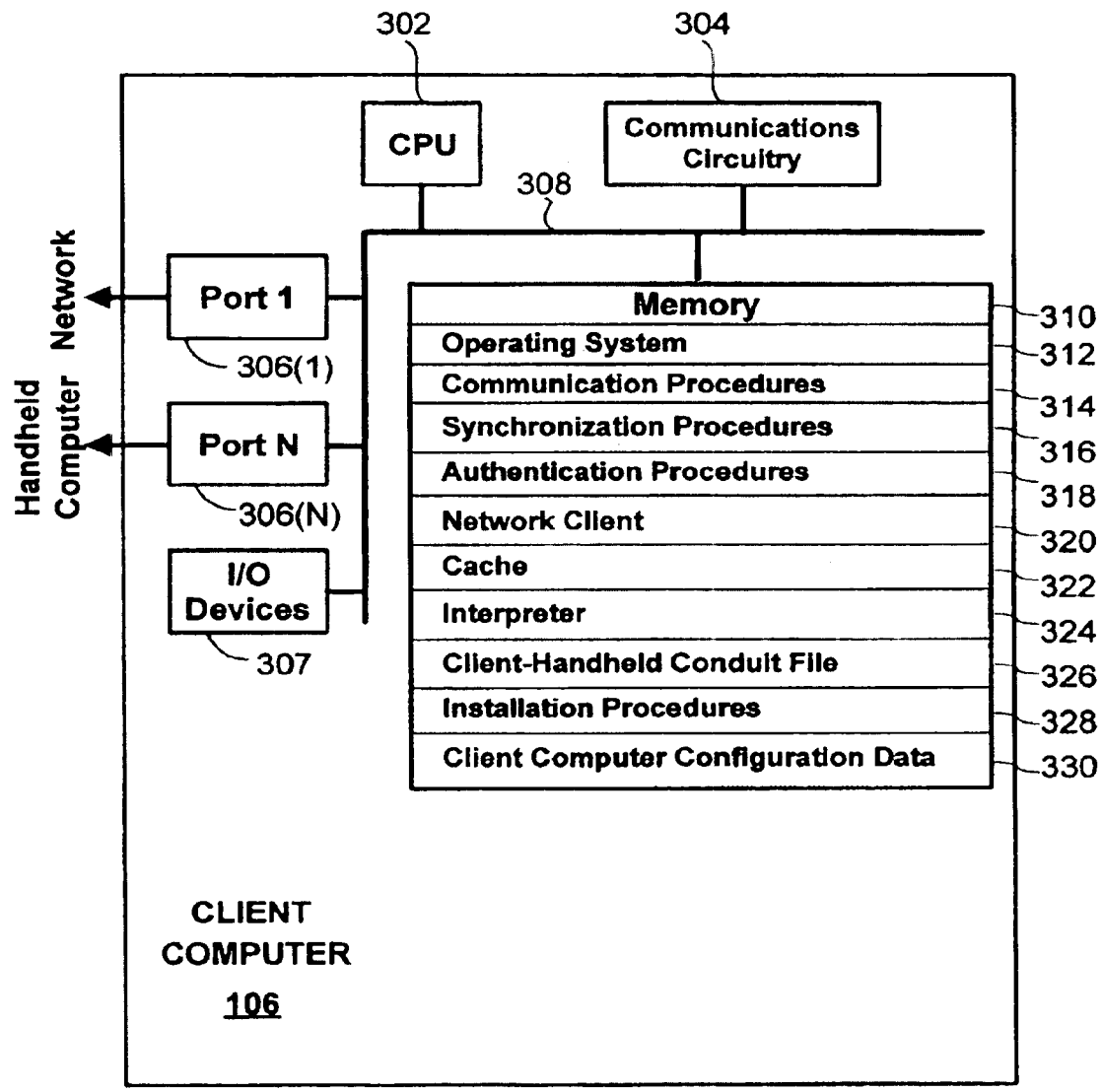
FIG. 3 is a diagrammatic view of the client computer shown in FIG. 1.

FIG. 3 is a block diagram of client computer 106. Client computer 106 comprises a plurality of components, such as a central processing unit (CPU) 302; communications circuitry 304; ports 306 (1)–(N), where port 1 is connected to network 104 (FIG. 1) and port N is connected to the handheld computer 116 (FIG. 1); input/output devices 307, such as a monitor and keyboard; a memory 310; and at least one bus 308 that connects the aforementioned components.

The memory 310 preferably includes an operating system 312, such as MICROSOFT WINDOWS™, DOS™, UNIX™, LINUX™ and MAC OS™, which has instructions for communicating, processing, accessing, storing, and searching data. The memory 310 further preferably includes: communications procedures 314, synchronization procedures 316, authentication procedures 318, a network client 320, and a cache 322 for temporarily storing data. In use, the cache may contain an interpreter 324, a client-handheld conduit file 326, installation procedures 328, and client computer configuration data 330.

Communications procedures 314 are used for communicating with both the network 104 (FIG. 1) and the handheld computer 116 (FIG. 1). Synchronization procedures 316 are used to synchronize the client computer 106 (FIG. 1) with the handheld computer 116 (FIG. 1). Synchronization of computing devices is well known in the art and described in U.S. Pat. Nos. 5,727,202; 6,243,705; and 6,330,618, all of which are incorporated by reference herein. Authentication procedures 318 are used to authenticate a user's access to the handheld file 224 (FIG. 2) on the installation server 102 (FIG. 1).

The network client 320 receives the content 220 (FIG. 2) from the installation server 102 (FIG. 1). The network client 320 may be a browser or similar type program, such as MICROSOFT'S INTERNET EXPLORER™ or NETSCAPE'S NAVIGATOR™.

Interpreter 324 is a high-level programming language translator that translates a program statement into machine language, executes it, and then proceeds to the next statement. Interpreter 324 is explained in further detail below in relation to FIG. 5B. In a preferred embodiment, interpreter 324 is the JAVA VIRTUAL MACHINE™. In one embodiment, interpreter 324 creates parameter tags to the applet tag in content 220 (FIG. 2). The client-handheld conduit file 326 is software which provides for bidirectional communication between the installation sever 102 (FIG. 1) and the handheld computer 116 (FIG. 1).

Installation procedures 328 are used to automatically download and install handheld file 224 (FIG. 2) onto the handheld computer 116 (FIG. 1), as explained in further detail below in relation to FIGS. 5E–5F. The client computer configuration data 330 contains the client computer's configuration information, such as the hardware and software that makes up the client computer 106 (FIG. 1).

Figure 4:
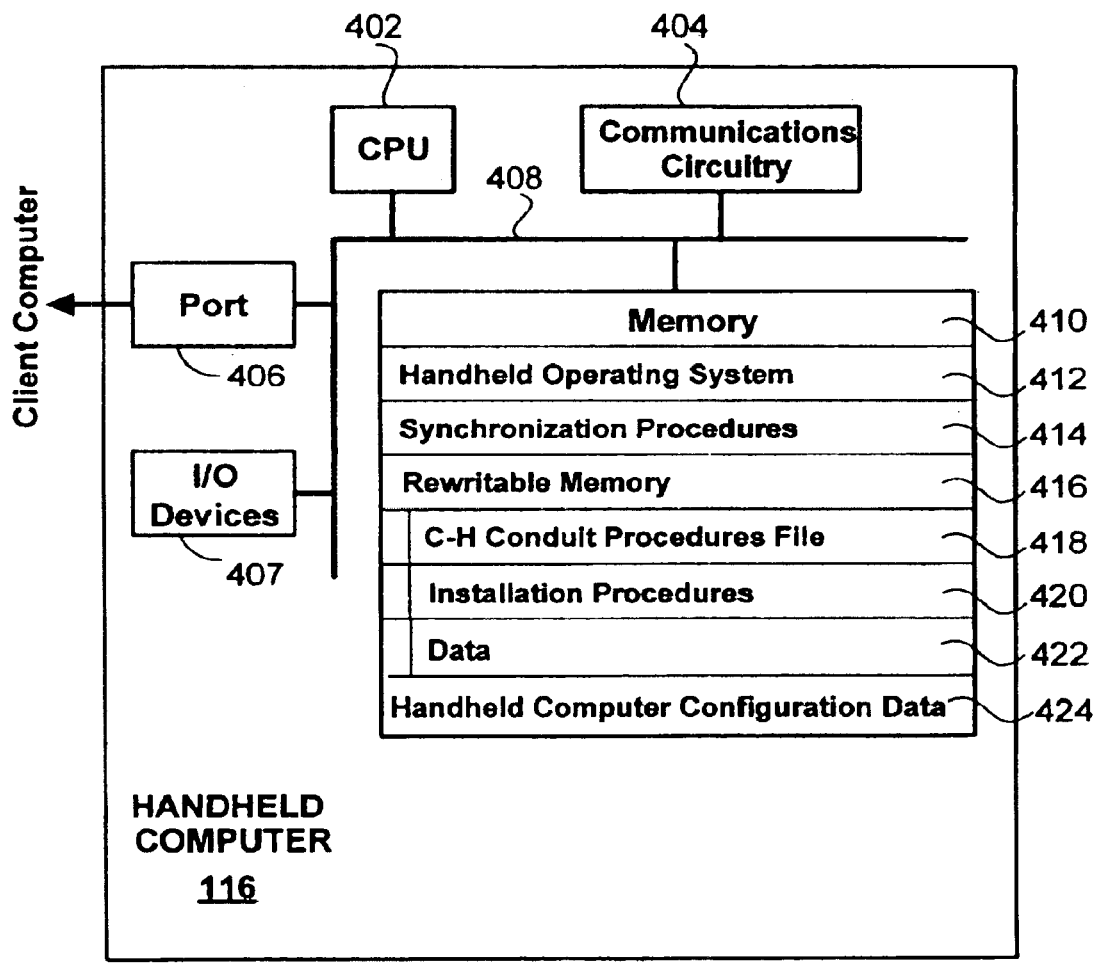
FIG. 4 is a diagrammatic view of the handheld computer shown in FIG. 1.

FIG. 4 is a block diagram of the handheld computer 116. Handheld computer 116 comprises a variety of components, such as a central processing unit (CPU) 402, communications circuitry 404, at least one port 406, input/output devices 407, memory 410, and at least one bus 408 that connects the aforementioned components.

The memory 410 preferably includes a handheld operating system 412, which has instructions for communicating, processing, accessing, storing, and searching data. The memory 410 further preferably includes synchronization procedures 414; a rewritable memory 416, such as FLASH™ memory; and handheld computer configuration data 424. In use, the rewritable memory 416 preferably temporarily stores a client-handheld conduit file 418, installation procedures 420, and other data 422.

Synchronization procedures 414 are used to synchronize handheld computer 116 with the client computer 106 (FIG. 1). The client-handheld conduit file 418 is used for communicating with installation server 102 (FIG. 1) as described in further detail below in relation to FIGS. 5E and 5F. Installation procedures 420 automatically download, decompress (if necessary) and install the handheld file onto the handheld computer 116.

Figure 5A:
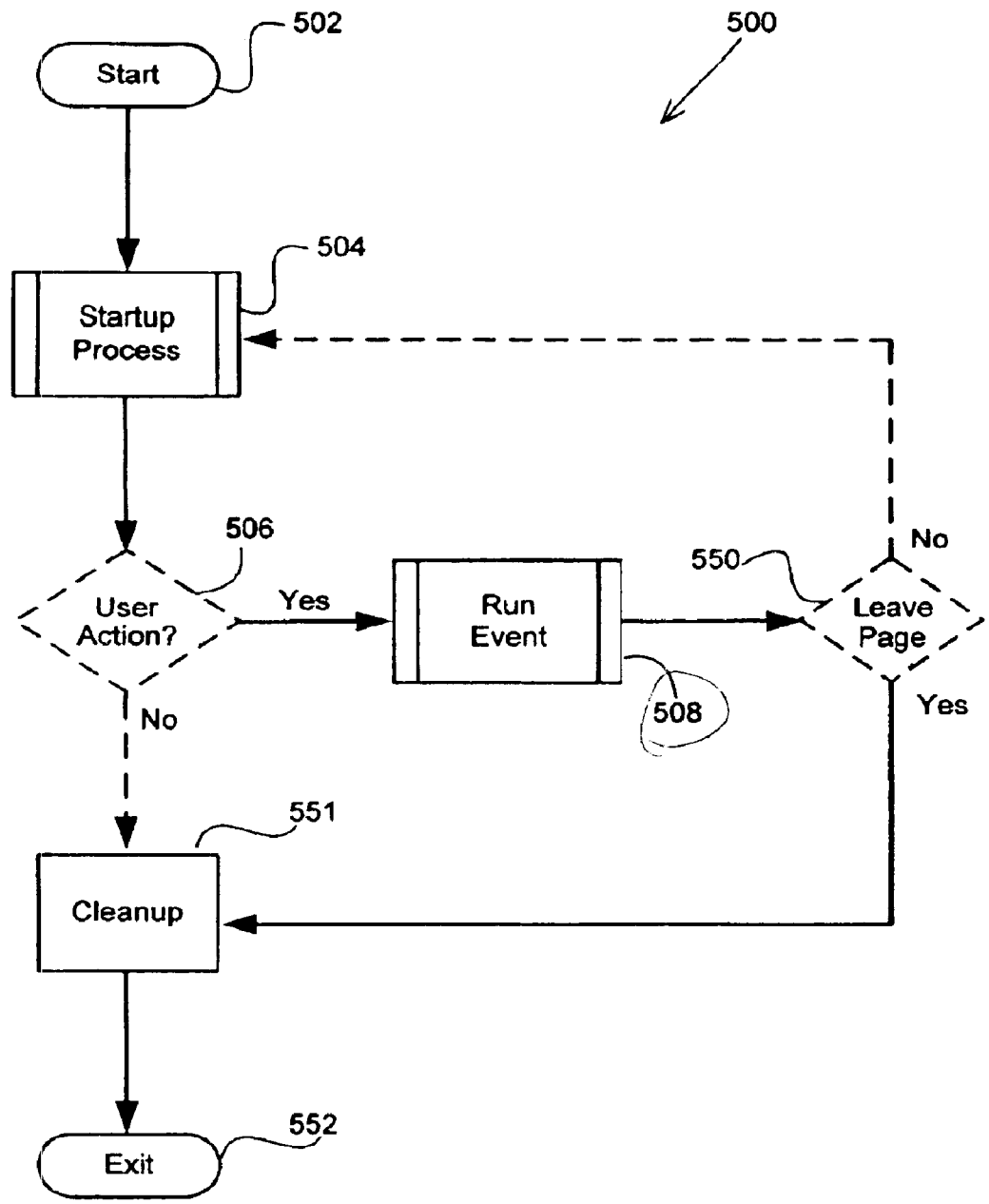
FIG. 5A is a flow chart of an overall installation method according to an embodiment of the invention.

FIGS. 5A–5F are flow charts 500 of a method for installing new handheld file(s) on a handheld computer according to an embodiment of the present invention. Referring to FIG. 5A the method begins at step 502 when the client computer is turned on and a connections established with the network. This may be manually established by a user dialing-up his or her Internet ISP, or automatically established by a broadband modem automatically connecting to the ISP. All communication between client computer and the installation server is through communication link using the communication procedures 314 (FIG. 3), as is well understood by those skilled in the art. Once the connection is established, the startup process is invoked at step 504. The startup process is described in further detail below in relation to FIG. 5B. After the start up process is completed, the network client 320 (FIG. 3) determines whether there is a user action, at step 506, to download a handheld file to a handheld device. If there is a user action (506—Yes), then an event is run at step 508. Further details of the event are described in relation to FIG. 5C. The network client 320 then determines whether the user has left the web page being viewed at step 550. If the user has not left the web page (550—No), then the process returns to the startup process at step 504. However, if the user has left the page (550—Yes), or if there was no user action (506—No), then the client proceeds, at step 551, to cleanup any temporary files from the client or handheld computer. It should be stressed that a client-handheld conduit files is preferably not left on either the client computer or the handheld computer. In one embodiment, this entails deleting the files placed in the cache of the client computer and the handheld computer by the installation server during the period the communication link between then was active. In another embodiment, the clean up of temporary files entails deleting the conduit file as well as other files placed in the caches of the client computer and the handheld computer by the installation server during the period the communication link was active. Once the cleanup is complete, the communication link is brought down and the method concluded, at step 552.

Figure 5B:
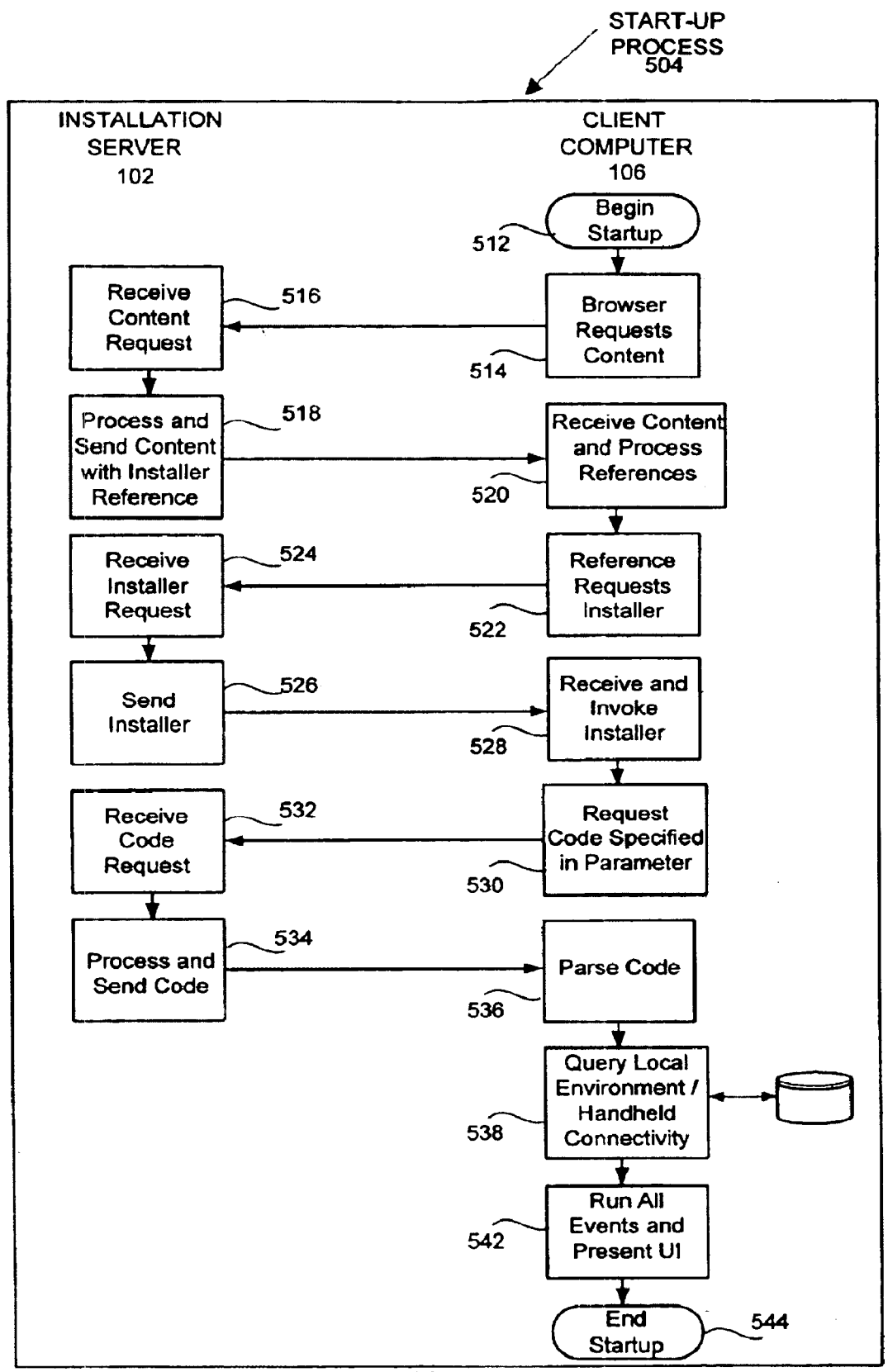
FIG. 5B is a more detailed flow chart of the "start-up process" portion of the method shown in FIG. 5A.

FIG. 5B is a flow chart showing in more detail the start up process performed at step 504 (FIG. 5A) for downloading and automatically installing the handheld file on the handheld computer. The client computer 106 begins the startup process, at step 512, by accessing the network through a port 306(1) (FIG. 3) using communication procedures 314. At step 514, the network client 320 (FIG. 3) requests content 220 (FIG. 2) from the installation server 102 (FIG. 1).

Using communication procedures 214 (FIG. 2), the installation server receives the content request from the client computer at step 516. The installation server processes the request and sends the content that includes an installer reference 221 (FIG. 2) to the client computer 106 at step 518. The installer reference is preferably a JAVA™ applet tag or the like. The client computer receives the content utilizing the network client, at step 520, and processes the content and any included installer reference 221. For example an HTTP page is processed containing a JAVA applet.

The installer reference 221 (FIG. 2) then calls for an installation file 223 (FIG. 2) and requests the installation file from the installation server at step 522. For example, an applet tag in a Web-page requests an installation file 223 located on the installation server 102.

Utilizing network server 218 (FIG. 2) the installation server 102 receives the request, at step 524, and sends the installation file 223 (FIG. 2) to the client computer 106 at step 526. The client computer 106 subsequently receives and invokes the installation file, at step 528, utilizing the installation procedures 328. Once invoked, the installation file 223 causes the interpreter 324 (FIG. 2) to request code specified in a parameter of the installation file at step 530. This code is preferably IML code, where IML is an XML (Extensible Markup Language) based language that assists in the installation. The code preferably contains user interface and installation action tags and references. This request for code is received by the installation server at step 532. Upon receipt of the code request, at step 532, the installation server processes the request and sends the code to the client computer at step 534.

The client computer parses the code at step 536. In other words, in a preferred embodiment, the code, received in XML, is parsed, that is it is translated into object code to make sure it is valid and contains the necessary variables and definitions. At step 538, the client computer queries the local environment on the client computer and ascertains handheld connectivity by simply querying the client computer configuration data 330 (FIG. 3). Also, the client computer preferably determines if any handheld computer files exist on the client computer and with what type of handheld device the client computer is configured to operate. Assuming a proper local environment exists, the client computer preferably executes the IML code running all the XML events and opens a user interface at step 542. In a preferred embodiment, the events and user interface are a Web-page displaying that the client and/or handheld computer has a particular configuration and can download and install the appropriate file. For example, a Web-page may be displayed that indicates that the user has a PALM™ device connected to it and can download the latest software. The start-up process ends at step 544.

Figure 5C:
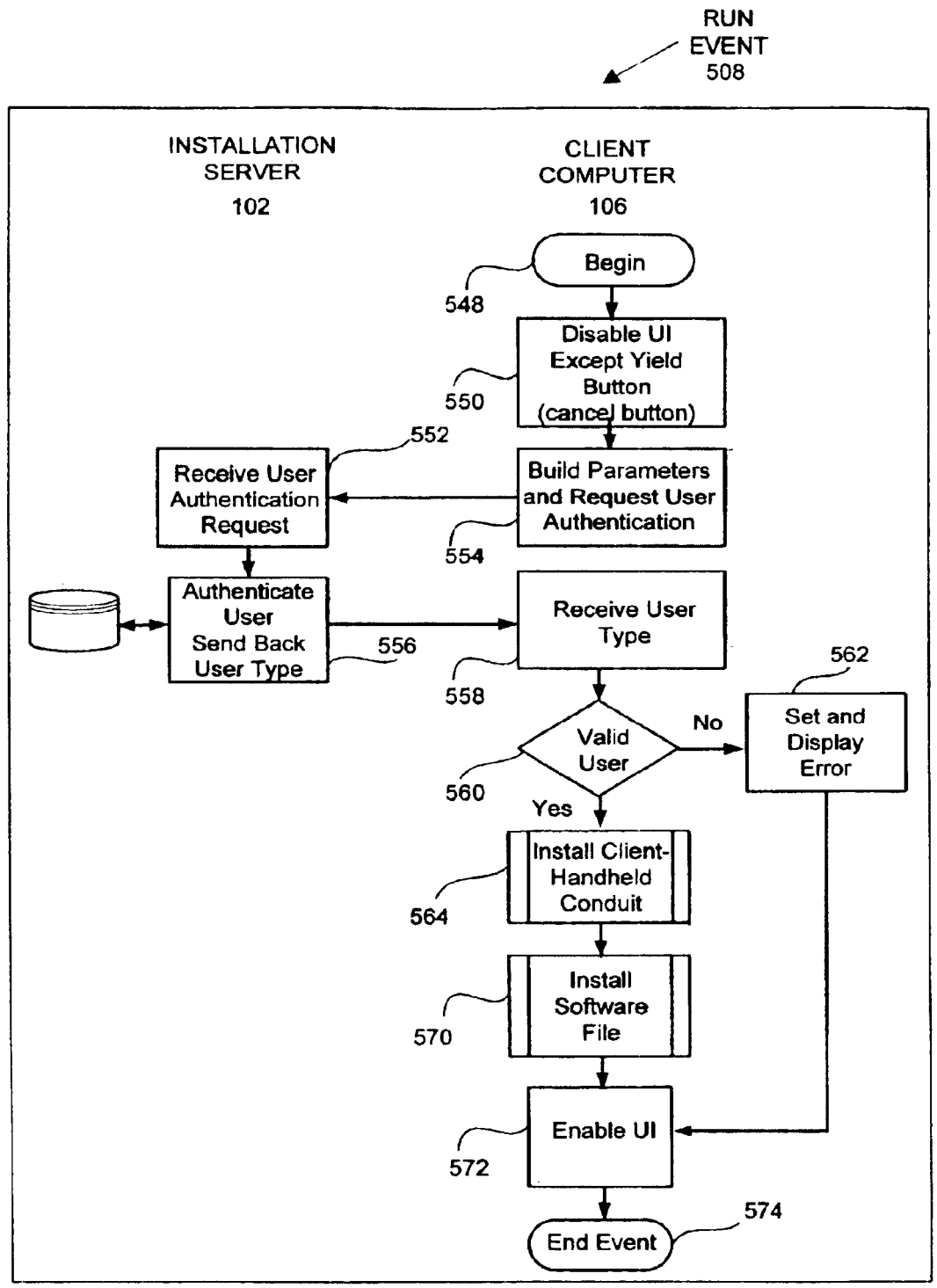
FIG. 5C is a more detailed flow chart of the "run event" portion of the method shown in FIG. 5A.

Once the startup process is completed, and if the user takes action at step 506, the run event 508 (FIG. 5A) is initiated at step 548 (FIG. 5C). Generally, the run event step 508 is a method for authenticating a user and for installing the handheld file on the handheld computer. The user interface is disabled, at step 550, except for the ability of a user to cancel the installation process, such as by pressing the cancel key.

To authenticate the user, the network client 320 (FIG. 3) builds an authentication request, which may contain entries for a username and a password, and requests user authentication, at step 554. The user authentication request is received by the installation server at step 552. The installation server authenticates or validates the user, at step 556, by the authentication procedures 216 (FIG. 2) checking the supplied username and password against the user database 226 (FIG. 2). At the same time, the installation server identifies the user type based on the user's authentication details from information contained in the user database 226 (FIG. 2). The identification of the user type provides details such as the type of user and handheld files to which the user has access to, or may be interested in, for example, the user's profession or area of speciality. The user type is sent back to the client computer, at step 556, and is received at the client computer at step 558. Based on the user type and whether the user has been authenticated, the client computer then determines, at step 560, if the user is a valid user, i.e., has been authenticated.

If the user is not a valid user (560—No), an error message is generated and displayed at step 562. For example, the user may be notified that he or she has not been authenticated. If the user is a valid user (560—Yes), the client-handheld conduit file is installed from the installation server at step 564, as explained below in relation to FIG. 5D.

After the client-handheld conduit file is installed, the handheld file 224 (FIG. 2) are installed on handheld computer at step 570 and the user interface enabled at step 572. Execution of the IML code is complete at step 574.

Figure 5D:
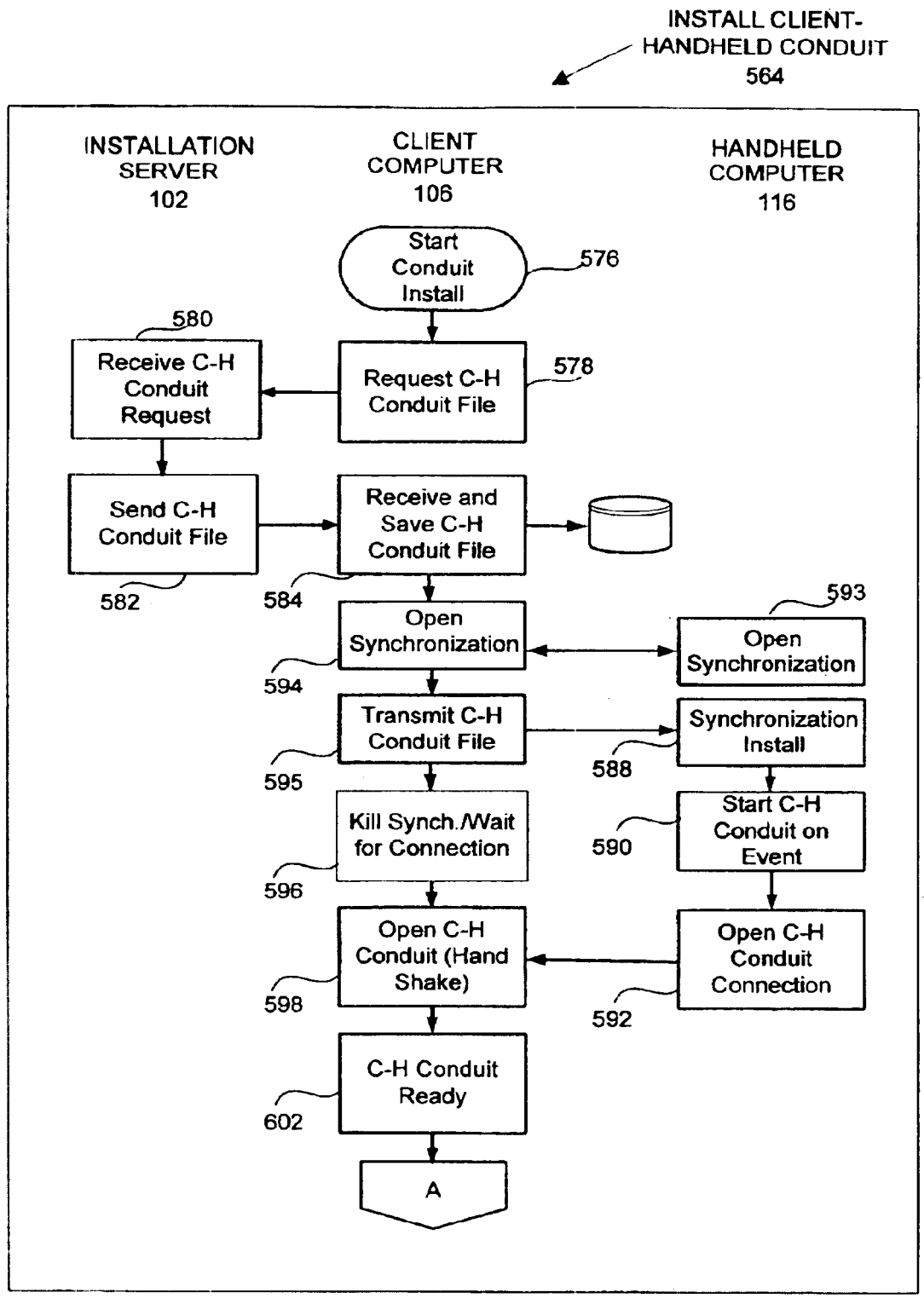
FIG. 5D is a more detailed flow chart of the "install client-handheld conduit" portion of the method shown in FIG. 5C.

FIG. 5D is a flow chart showing further detail of the install client-handheld conduit step 564 of FIG. 5C. This install client-handheld conduit step installs a client-handheld conduit file 232 (FIG. 2) and 418 (FIG. 4) from the installation server onto the handheld computer. Once it is determined that the user is a valid user (560—Yes) (FIG. 5C), the client computer begins the conduit install at step 576 by requesting a client-handheld conduit file 232 (FIG. 2) from the installation server at step 578. This client-handheld conduit file is an executable file that provides for communication between the client computer and the handheld computer. The installation server receives the request, at step 580, and transmits the client-handheld conduit file to client computer at step 582. The client computer receives the client-handheld conduit file and saves it into its cache as client-handheld conduit file 326 (FIG. 3), at step 584.

The user is then prompted, to initiate a synchronization session between the handheld computer and the client computer, such as by pressing the button 114 (FIG. 1). A synchronization link is then opened at steps 594 and 593 between the client computer and the handheld computer using the synchronization procedures 316 (FIG. 3) and 414 (FIG. 4), as is well understood by those skilled in the art. After opening the synchronization session, the client-handheld conduit file is transmitted to the handheld computer at step 595. The client-handheld conduit file is received and installed on the handheld computer, at step 588, as the client-handheld conduit file 418 (FIG. 4). The synchronization session is then ended and the client computer waits for further communication at step 596.

Following installation of the client-handheld conduit file 418 (FIG. 4) on the handheld computer, the client-handheld conduit file 418 (FIG. 4) are automatically invoked, at step 590, and a client-handheld conduit opened between the handheld and the client computer at steps 592 and 598. This typically involves a handshake procedure between the handheld and client computer. The handheld computer is now ready to receive a handheld file from the installation server, at step 602.

It should be appreciated that the client-handheld conduit file is preferably a small file. This enables the client-handheld conduit file to be downloaded to the handheld computer each time that additional or new handheld files are installed or transferred to the handheld computer from the installation server. This is quite unlike the prior art that requires previously installed communication software to be installed on the handheld computer. By installing the client-handheld conduit file onto the handheld computer each time that the handheld file is transferred to the handheld computer, the installer does not need, nor in fact care, whether the handheld computer has any previously installed procedures for communicating with a client computer or installation server.

Once the client-handheld conduit has been established at step 564 (FIG. 5C), the install software file portion 570 (FIG. 5C) of the method is invoked. FIGS. 5E and 5F are flow charts showing the install software file portion 570 of the method in detail. The install software file portion 570 of the method provides for the installation of handheld file 224 (FIG. 2) on the handheld computer through the recently established client-handheld conduit.

Figure 5E:
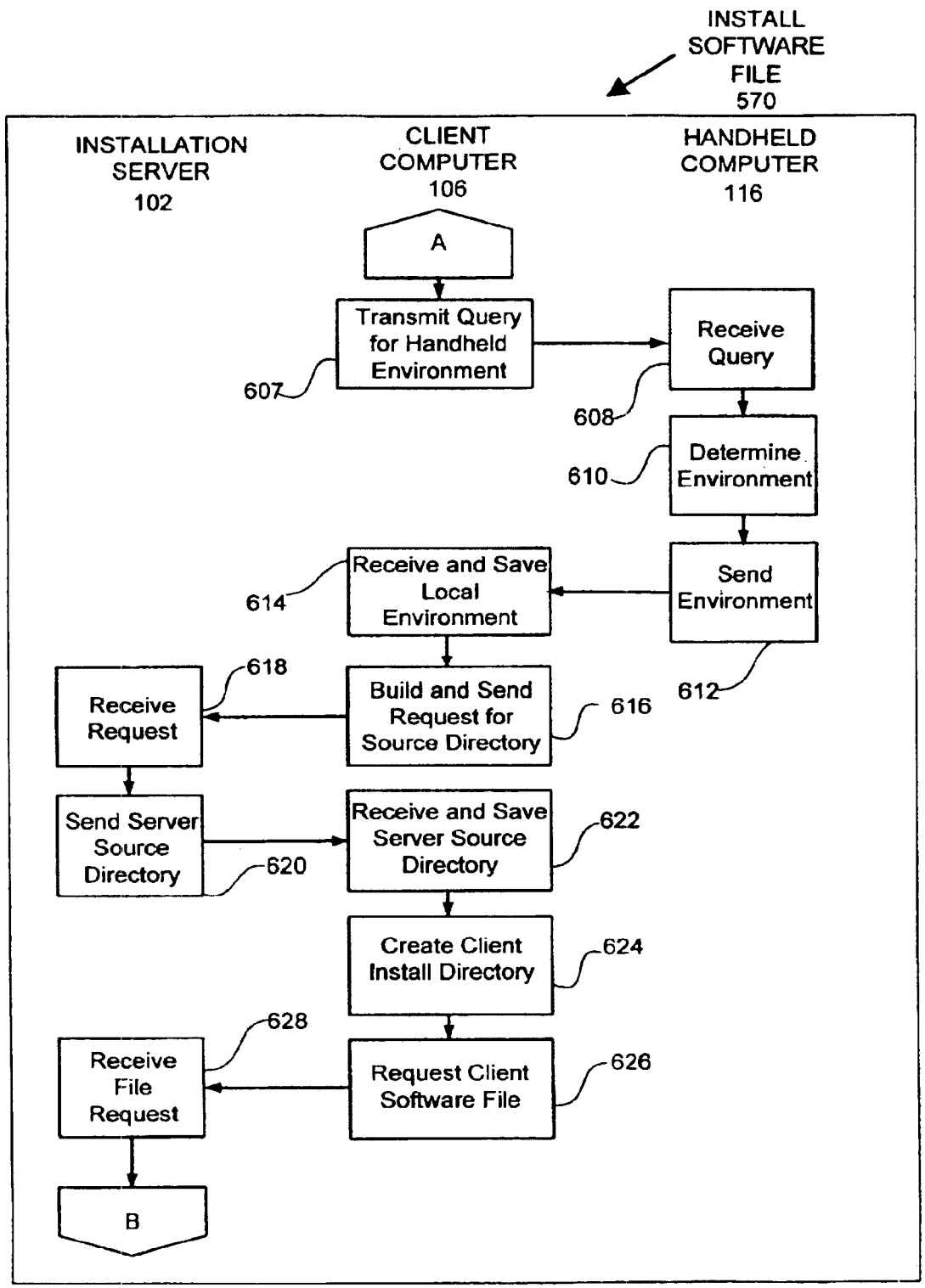
FIGS. 5E and 5F are more detailed flow charted of the "install handheld file" portion of the method shown in FIG. 5C.

Referring to FIG. 5E, the installation is initiated by client computer transmitting a query to the handheld computer to determine the handheld computer's environment information at step 607. The handheld computer'environment information is stored as the handheld configuration configuration data 424 (FIG. 4) on the handheld computer. The handheld configuration configuration data preferably includes the type of handheld computer, the handheld computer'operating system, the files and software on the handheld computer, the most recent update information on the handheld computer, the handheld computer'display references, the handheld computer'memory size, the nature and type of information which is contained on the handheld computer, or the like.

At step 608 the handheld computer receives the request and determines its environment, at step 610. The handheld computer then sends its environment information back to client computer at step 612. The client computer receives and saves the environment information from the handheld computer at step 614. The client computer develops a profile of the handheld computer from this environment information and sends a request for a source directory to installation server at step 616. For example, if the handheld computer has a PALM operating system, then the client computer builds a request for the source directory containing the handheld file specific to the PALM operating system.

The installation server receives the request, at step 618, determines the appropriate source directory 228 (FIG. 2), and sends the address of the source directory to the client computer at step 620. The client computer receives the server source directory and saves the source directory information at step 622. At step 624, the client computer creates an install directory, and thereafter requests a client software file from the installation server at step 626. The request is received by the installation server at step 628. The installation server then sends the file from the source directory at step 630, which is received by the client computer at step 632 (FIG. 5F).

In an alternative embodiment, the steps 616–632 do not occur. Rather, the client computer immediately requests the handheld file, as described below in relation to FIG. 5F.

Figure 5F:
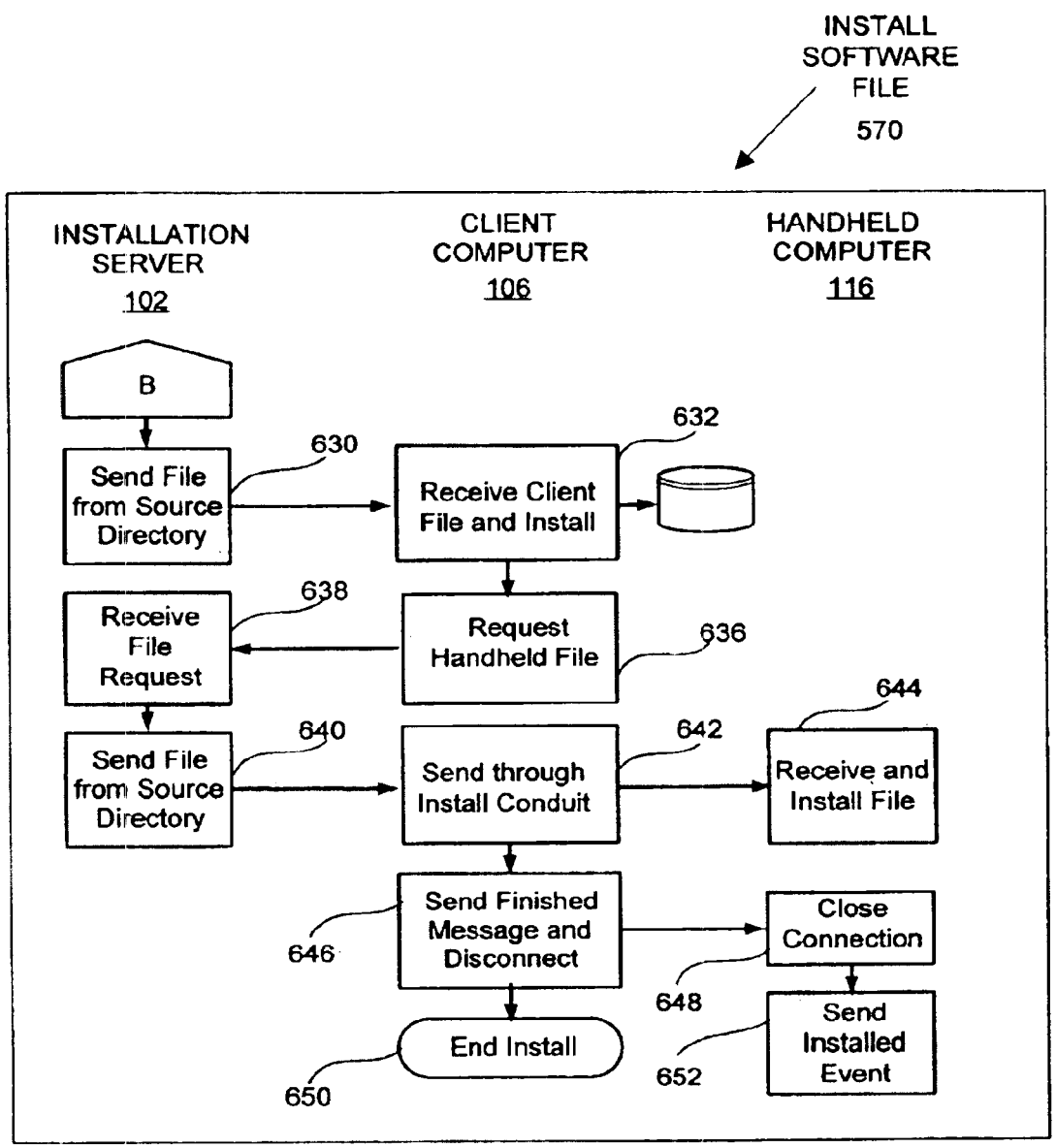

Referring to FIG. 5F, the client computer then requests the handheld file from the installation server at step 636. The installation server receives the request at step 638 and sends the handheld file, at step 640, toward the client computer. The client computer receives the handheld file and sends it to the handheld computer through the client-handheld conduit at step 642. The handheld computer receives and installs the file at step 644. Once the handheld file has been transmitted from the client computer to the handheld computer, the client computer sends a message to the handheld computer indicating that the transfer of the handheld file is complete, at step 646. The handheld computer receives this message and terminates the connection to the client computer at step 648. The install process is then completed, both on the client computer, at step 650, and on the handheld computer at step 652.

The above described system and method, therefore, allows a handheld file to be installed on a handheld computer with the minimal amount of steps and without having to pre-install specific installation or conduit software on the handheld computer. In a preferred embodiment, the only user interaction required for installing a software program on a handheld computer is synchronizing the handheld computer with their client computer. However, in an alternative embodiment where the synchronization can be invoked by the client computer, the user need not perform any interaction.

In addition, the current method automatically customizes the installation based on the handheld computer's particular local environment. Therefore, this system and method significantly reduces user interaction, thereby simplifying the user experience and avoiding potential download and installation mishaps.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. In addition, use of singular terms also includes their plural, such as handheld file includes one or more handheld files. It is intended that the scope of the invention be defined by the following claims and their equivalents.

What is claimed is:

1. A computer implemented method for installing a handheld file on a handheld computer, comprising:
    requesting at a client computer a client-handheld conduit file from an installation server;
    receiving at said client computer said client-handheld conduit file from said installation server;
    establishing a synchronization session between said client computer and a handheld computer coupled to said client computer;
    transmitting said client-handheld conduit file to said handheld computer from said client computer;
    opening a client-handheld conduit between said client computer and said handheld computer using said client-handheld conduit file;
    requesting a handheld file from said installation server;
    receiving at said client computer said handheld file from said installation server; and
    transmitting said handheld file from said client computer to said handheld computer for installation on said handheld computer,
where said method is performed each time a new handheld file is installed on said handheld computer, and where all steps following said establishing step occur without any user intervention.

2. The computer implemented method of claim 1, further comprising, after said opening, determining at said client computer a local environment on said handheld computer via said client-handheld conduit.

3. The computer implemented method of claim 2, wherein said requesting said handheld file from said installation server is based on said local environment on said handheld computer.

4. The computer implemented of claim 2, wherein said determining comprises:
    transmitting a query for said local environment on said handheld computer to said handheld computer via said client-handheld conduit; and
    receiving information relating to said local environment from said handheld computer.

5. The computer implemented of claim 1, further comprising, prior to said requesting,
    building a source directory request for a source directory specific to said local environment on said handheld computer;
    sending said source directory request to said installation server; and
    receiving said source directory from said installation server.

6. The computer implemented of claim 5, wherein said requesting comprises requesting said handheld file from said source directory on said installation server.

7. The computer implemented of claim 1, further comprising, before requesting a client-handheld conduit file, authenticating a user.

8. A computer implemented method for installing a handheld file on a handheld computer, comprising:
    establishing a synchronization session between a handheld computer and a client computer;
    receiving at said handheld computer a client-handheld conduit file from said client computer;
    opening a client-handheld conduit between said client computer and said handheld computer using said client-handheld conduit file;
    receiving at said handheld computer a handheld file from said client computer; and
    installing said handheld file on said handheld computer,
where said entire method is performed each time a new handheld file is installed on said handheld computer, and where all steps following said establishing step occur without any user intervention.

9. The computer implemented method of claim 1, further comprising, after said opening, receiving a request for a local environment of said handheld computer via said client-handheld conduit.

10. The computer implemented method of claim 9, wherein a type of said handheld file received is based on said local environment on said handheld computer.

11. A computer program product for installing a new handheld file on a handheld computer, the computer program product comprising a computer readable storage and a computer program stored therein, the computer program comprising:
    instructions for requesting at a client computer a client-handheld conduit file from an installation server;
    instructions for receiving at said client computer said client-handheld conduit file from said installation server;
    instructions for establishing a synchronization session between said client computer and a handheld computer coupled to said client computer;
    instructions for transmitting said client-handheld conduit file to said handheld computer from said client computer;
    instructions for opening a client-handheld conduit between said client computer and said handheld computer using said client-handheld conduit file;
    instructions for requesting a handheld file from said installation server;
    instructions for receiving at said client computer said handheld file from said installation server; and
    instructions for transmitting said handheld file from said client computer to said handheld computer for installation on said handheld computer,
where said entire method is performed each time a new handheld file is installed on said handheld computer, and where all steps following said establishing step occur without any user intervention.

12. The computer program product of claim 11, wherein said computer program further comprises instructions for determining at said client computer a local environment on said handheld computer via said client-handheld conduit.

13. A system for installing a new handheld file on a handheld computer, comprising:

at least one installation server coupled to a network;

at least one client computer coupled to said network; and at least one handheld computer coupled to said client computer, wherein said client computer comprises:
a Central Processing Unit (CPU);
communications circuitry; and
a memory comprising:

instructions for requesting a client-handheld conduit file from said installation server;

instructions for requesting at said client computer a client-handheld conduit file from an installation server;

instructions for receiving at said client computer said client-handheld conduit file from said installation server;

instructions for establishing a synchronization session between said client computer and said handheld computer;

instructions for transmitting said client-handheld conduit file to said handheld computer from said client computer;

instructions for opening a client-handheld conduit between said client computer and said handheld computer using said client-handheld conduit file;

instructions for requesting a handheld file from said installation server;

instructions for receiving at said client computer said handheld file from said installation server; and instructions for transmitting said handheld file from said client computer to said handheld computer for installation on said handheld computer, where said entire method is performed each time a new handheld file is installed on said handheld computer, and where all steps following said establishing step occur without any user intervention.

14. The computer program product of claim 13, wherein said memory further comprises instructions for determining at said client computer a local environment on said handheld computer via said client-handheld conduit.

* * * * *

UNITED STATES PATENT AND TRADEMARK OFFICE
CERTIFICATE OF CORRECTION

| | | |
|---|---|---|
| PATENT NO. | : 6,944,859 B2 | |
| APPLICATION NO. | : 10/355686 | |
| DATED | : September 13, 2005 | |
| INVENTOR(S) | : Samuel David Bunger | |

It is certified that error appears in the above-identified patent and that said Letters Patent is hereby corrected as shown below:

Claim 4, column 11, line 55, "implemented of claim" should be changed to --implemented method of claim--.

Claim 5, column 11, line 62, "implemented of claim" should be changed to --implemented method of claim--.

Claim 6, column 12, line 5, "implemented of claim" should be changed to --implemented method of claim--.

Claim 7, column 12, line 8, "implemented of claim" should be changed to --implemented method of claim--.

Claim 14, column 14, line 19, "computer program product" should be changed to --system for installing a new handheld file on a handheld computer--.

Signed and Sealed this

Thirty-first Day of July, 2007

JON W. DUDAS
*Director of the United States Patent and Trademark Office*